(12) United States Patent
Satake

(10) Patent No.: US 10,965,127 B2
(45) Date of Patent: Mar. 30, 2021

(54) POWER CONTROLLER

(71) Applicant: Yazaki Corporation, Tokyo (JP)

(72) Inventor: Shuuji Satake, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/576,203

(22) Filed: Sep. 19, 2019

(65) Prior Publication Data

US 2020/0136393 A1 Apr. 30, 2020

(30) Foreign Application Priority Data

Oct. 24, 2018 (JP) .............................. JP2018-200004

(51) Int. Cl.
| | | |
|---|---|---|
| *H02S 40/32* | (2014.01) | |
| *H02J 3/38* | (2006.01) | |
| *G05F 1/67* | (2006.01) | |
| *H02J 7/35* | (2006.01) | |
| *G05F 1/66* | (2006.01) | |
| *H02J 7/34* | (2006.01) | |

(52) U.S. Cl.
CPC ............... *H02J 3/383* (2013.01); *G05F 1/67* (2013.01); *H02J 7/35* (2013.01); *H02S 40/32* (2014.12); *G05F 1/66* (2013.01); *H02J 3/38* (2013.01); *H02J 7/34* (2013.01)

(58) Field of Classification Search
CPC .. H02J 3/383; H02J 7/35; H02S 40/32; G05F 1/67
See application file for complete search history.

(56) References Cited

U.S. PATENT DOCUMENTS

| | | | |
|---|---|---|---|
| 8,901,860 B2* | 12/2014 | Yaoi ......................... | G05F 1/67 |
| | | | 318/139 |
| 9,868,358 B2* | 1/2018 | Kono ...................... | B60L 53/22 |
| 10,224,815 B2* | 3/2019 | Nishimura .......... | H02M 3/1582 |
| 2008/0042493 A1* | 2/2008 | Jacobs .................. | H02J 7/0018 |
| | | | 307/82 |
| 2009/0147554 A1* | 6/2009 | Adest ....................... | H02J 3/46 |
| | | | 363/71 |

(Continued)

FOREIGN PATENT DOCUMENTS

| | | |
|---|---|---|
| CN | 104578043 A | 4/2015 |
| JP | 07-302130 A | 11/1995 |
| JP | 2012-199519 A | 10/2012 |

*Primary Examiner* — Daniel Cavallari
*Assistant Examiner* — Kalu Kelly Emeaba
(74) *Attorney, Agent, or Firm* — Sughrue Mion, PLLC

(57) ABSTRACT

A plurality of DC/DC converters is provided for each group of solar panels and is configured to convert an output power of the solar panels. A charger includes an input to which outputs of the plurality of DC/DC converters are connected and is configured to convert an input voltage with maintaining the input voltage to a lower limit voltage during charging. The control device controls each of the plurality of DC/DC converters independently. Each of the plurality of control devices is configured to control so as to gradually increase the output voltage of the DC/DC converter from the lower limit voltage, measure the output power of the solar panel each time the output voltage is increased, and search for the output voltage where the measured output power is maximum and maintain that output voltage.

2 Claims, 4 Drawing Sheets

INPUT AND OUTPUT CHARACTERISTICS OF DC/DC CONVERTOR (CHARGER)

(56) References Cited

U.S. PATENT DOCUMENTS

| | | | |
|---|---|---|---|
| 2011/0019445 A1* | 1/2011 | Wu | H02M 3/33507 363/78 |
| 2011/0084553 A1* | 4/2011 | Adest | H02J 7/00 307/63 |
| 2012/0133322 A1* | 5/2012 | Walsh | H01M 16/00 320/101 |
| 2012/0136534 A1* | 5/2012 | Walsh | B60L 8/003 701/36 |
| 2012/0201016 A1* | 8/2012 | Robertson | B62D 63/08 362/183 |
| 2012/0205974 A1* | 8/2012 | McCaslin | H02J 3/381 307/18 |
| 2013/0016536 A1* | 1/2013 | Ehlmann | H02J 3/381 363/34 |
| 2013/0094247 A1* | 4/2013 | Kleinpenning | H02M 3/33523 363/16 |
| 2013/0264865 A1* | 10/2013 | Sugeno | H02J 3/32 307/9.1 |
| 2013/0307342 A1 | 11/2013 | Niemela | |
| 2018/0109183 A1* | 4/2018 | Stoger | H02M 3/156 |

\* cited by examiner

OUTPUT CHARACTERISTICS OF
DC/DC CONVERTOR
(SOLAR POWER GENERATING DEVICE)

INPUT AND OUTPUT CHARACTERISTICS OF
DC/DC CONVERTOR
(CHARGER)

POWER CONTROLLER

TECHNICAL FIELD

The present invention relates to a power controller.

BACKGROUND

In recent years, solar cells have been actively developed towards zero carbon dioxide emission. Among these, there have been proposed solar cell systems that utilize a maximum power point tracking (MPPT) control to improve a power extraction efficiency (refer to Patent Documents 1, 2 listed below). The MPPT control is used to operate a power converter such as an inverter and a converter that converts output power of the solar cell so as to generate maximum output power of the solar cell. In these solar cell systems, the MPPT control is performed separately with respect to individual solar cells, instead of performing the MPPT control collectively with respect to the plurality of solar cells.

However, although the maximum power for each solar cell can be generated by performing the MPPT control for each solar cell, it is also necessary to consider after the power from solar cells are combined. For this purpose, it is possible to provide a control device for grasping electricity generation amounts of all solar cells, where the control device may control an output voltage from each power converter so as to maintain the maximum power.

In this case, however, the control device needs to grasp the electricity generation amounts of all solar cells, causing the device to be complicated and causing an increase in the cost.

PRIOR ART DOCUMENT

Patent Document

Patent Document 1: JP H7-302130 A
Patent Document 2: JP 2012-199519 A

SUMMARY OF THE INVENTION

Problem to be Solved

In view of the above-described problem, an object of the present invention is to provide a power controller having high power extraction efficiency.

Solution to Problem

In order to achieve the above-described object, the present invention provides, in one aspect, a power controller configured to extract power from a group of solar cells, including a plurality of converters provided for each group of solar cells and configured to convert output power of the solar cells, a charger including an input to which outputs of the plurality of converters are connected and configured to convert an input voltage with maintaining the input voltage to a reference voltage during charging, and a plurality of control devices configured to control each of the plurality of converters independently, wherein each of the plurality of control devices is configured to control so as to gradually increase the output voltage of the converter from the reference voltage, measure the output power of the solar cell each time the output voltage of the converter is increased, and search for the output voltage where the measured output power is maximum and maintain that output voltage.

Each of the plurality of control devices may be configured to control such that the converters operate to provide a constant current when an output current of the converter becomes equal to or larger than an upper limit current, and the reference voltage may be set to be equal to or larger than the output voltage obtained when the output current has reached to the upper limit current as a result of reducing the output voltage of the converter and increasing the output current of the converter.

The power controller may further include a storage device configured to store a conversion efficiency of the solar cell, and a calculating device configured to calculate a maximum power of the solar cell based on the conversion efficiency, wherein the plurality of control devices is configured to control to maintain the output voltage of the converter where the measured output power is the maximum power calculated by the calculating device.

Advantageous Effect of the Invention

According to the above-described embodiment, the control device gradually increases the output voltage of the converter from the reference voltage and searches for a point where the output power of the solar cell is maximum. Consequently, the output voltage of the converter can be higher than the input voltage (reference voltage) of the charger during the charging, allowing the output current from the converter to be inputted to the charger. Further, since each of the control devices controls the converters independently, a control device that grasps the electricity generation amounts of all solar panels is not required, thus the power controller having high power extraction efficiency can be provided at low cost.

DETAILED DESCRIPTION OF THE EXEMPLARY EMBODIMENTS

The following will explain a power controller 1 according to the present invention with reference to the drawings.

Figure 1:
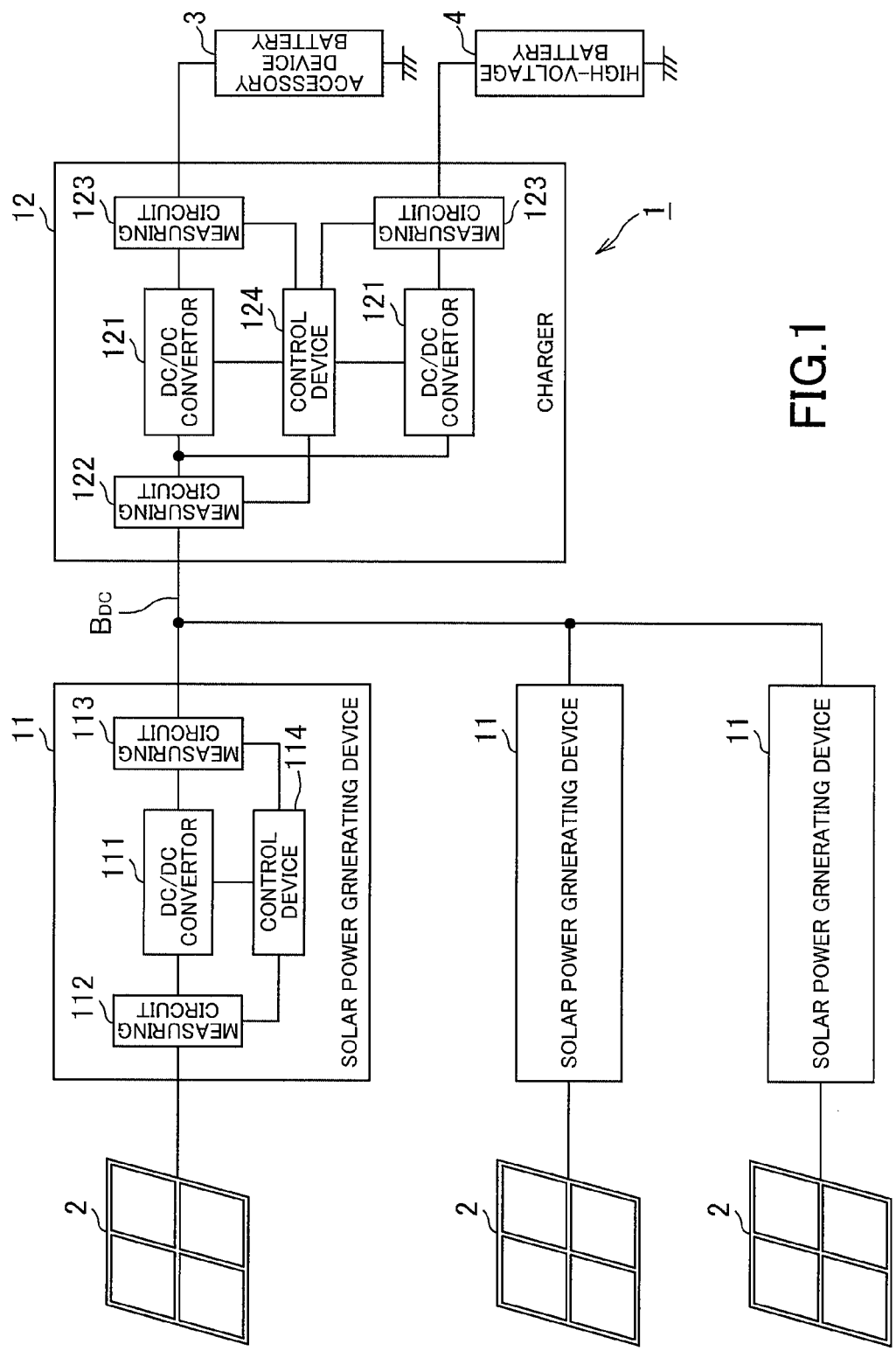
FIG. 1 is a block diagram showing one embodiment of a power controller according to the present invention.
Figure 2:
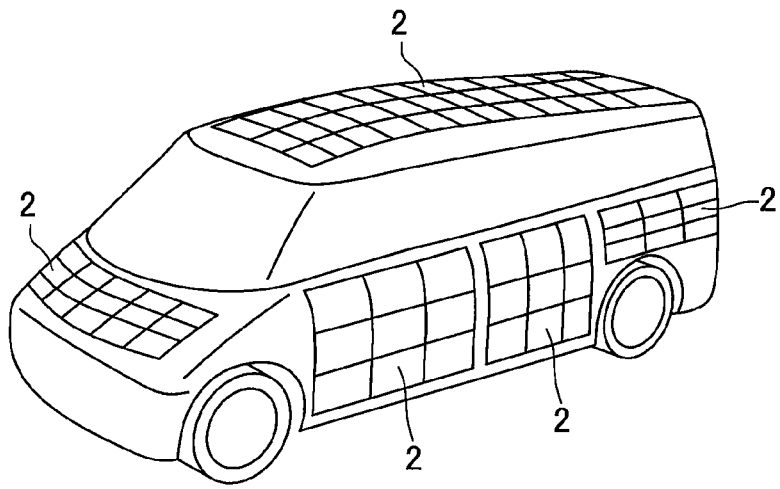
FIG. 2 illustrates an example of installation of solar panels shown in FIG. 1.

The power controller 1 shown in FIG. 1 is a device that controls power from a plurality of solar panels (solar cells) 2 and charges an accessory device battery 3 and/or a high-voltage battery 4. As shown in FIG. 2, the solar panels 2 are positioned at respective parts of a vehicle body such as a vehicle roof, door and bonnet. The solar panels 2 vary in size and an amount of incident light depending on the installation position. Output characteristics of the solar panels 2 are shown in FIG. 3.

Figure 3:
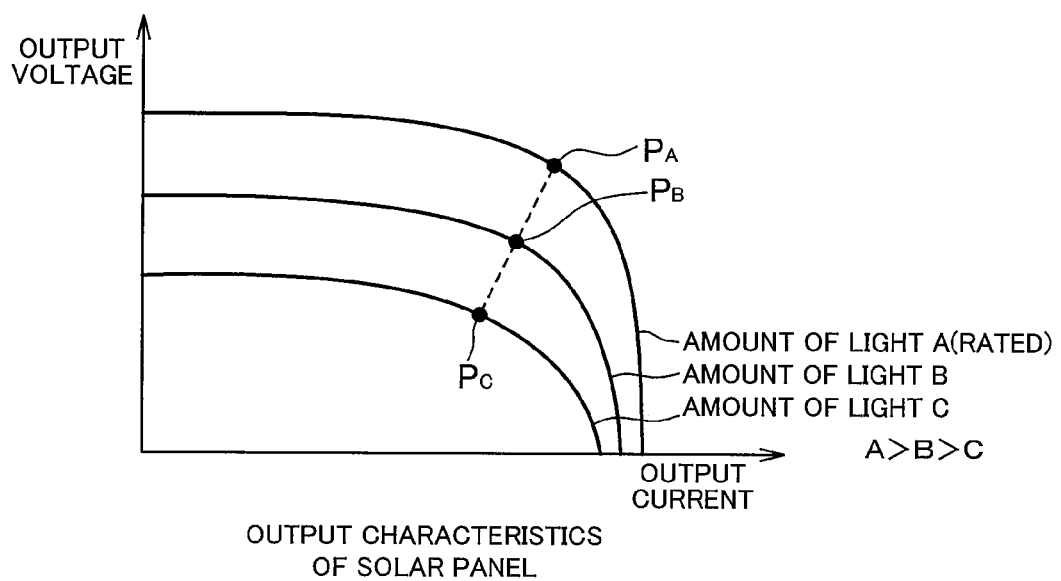
FIG. 3 is a graph showing output characteristics for each irradiance with respect to the solar panel shown in FIG. 1.

As shown in FIG. 3, an electricity generation amount of the solar panel 2 is substantially proportional to an amount of incident light. In addition, when an output current is small, an output voltage of the solar panel 2 slowly decreases as the output current gets larger, but when the output current is large, the output voltage of the solar panel 2 rapidly decreases as the output current gets larger.

The accessory device battery 3 is constituted of, for example, a 12V battery. The high-voltage battery 4 is constituted of a battery having a higher voltage than the accessory device battery 3.

As shown in FIG. 1, the power controller 1 is provided for each group of solar panels 2, and includes a plurality of solar power generating devices 11 configured to control the electricity generation amounts of the solar panels 2, and a charger 12 configured to control charging of the batteries 3, 4.

Each of the solar power generating devices 11 includes a DC/DC converter 111, measuring circuits 112, 113 and a control device 114 configured to control the DC/DC converter 111.

The DC/DC converter 111 is a well-known DC/DC converter having a smoothing capacitor and/or a switch element (not shown), and is configured to convert an output power (direct-current power) of the solar panel 2 and output it.

The measuring circuit 112 measures an output voltage and an output current of the solar panel 2 (i.e., an input voltage and an input current of the DC/DC converter 111) and supplies them to the later-described control device 114. The measuring circuit 113 measures an output voltage and an output current of the DC/DC converter 111 and supplies them to the later-described control device 114.

The control device 114 is constituted of a well-known microcomputer such as a CPU, ROM and RAM. The control device 114 is configured to input a pulse width modulated pulse to a switch element of the DC/DC converter 111 such that an output power (i.e., output current×output voltage) of the solar panel 2 corresponds to a maximum power point $P_A$, $P_B$, $P_C$ (FIG. 3). The output characteristics of the DC/DC converter 111 arranged to be controlled by this control device 114 are shown in FIG. 4.

Figure 4:
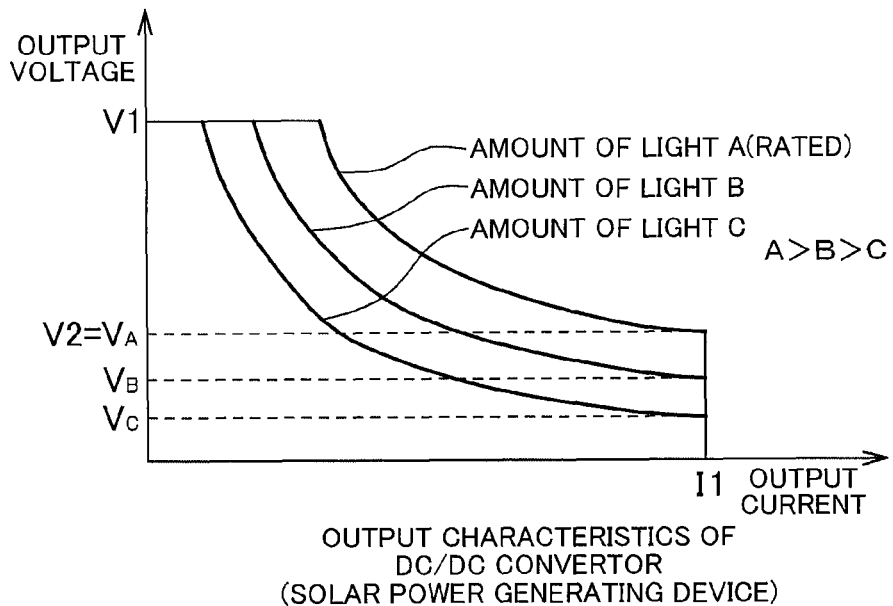
FIG. 4 is a graph showing output current-output voltage characteristics of a DC/DC converter shown in FIG. 1.

As shown in FIG. 4, the control device 114 is configured to operate the DC/DC converter 111 to provide a constant voltage when the output voltage measured by the measuring circuit 113 has reached to a predetermined upper limit voltage V1. Further, the control device 114 is configured to operate the DC/DC converter 111 to provide a constant current when the output current measured by the measuring circuit 113 has reached to a predetermined upper limit current I1. Further, the output current of the DC/DC converter 111 is increased as the output voltage is decreased from the upper voltage V1 by the control of the control device 114.

As shown in FIG. 1, the outputs of the plurality of DC/DC converters 111 are connected to a DC bus $B_{DC}$, and are inputted to the later-described charger 12. An output of the charger 12 is connected to the batteries 3, 4 and charges the batteries 3, 4. The charger 12 includes a DC/DC converter 121, measuring circuits 122, 123 and a control device 124 configured to control the DC/DC converter 121.

The DC/DC converter 121 is a well-known DC/DC converter having a smoothing capacitor and/or a switch element (not shown), and is configured to convert an input power from the DC bus $B_{DC}$ and output it.

The measuring circuit 122 measures an input voltage and an input current from the DC bus $B_{DC}$ and supplies them to the later-described control device 124. The measuring circuit 123 measures an output voltage and an output current of the DC/DC converter 123 and supplies them to the later-described control device 124.

Figure 5:
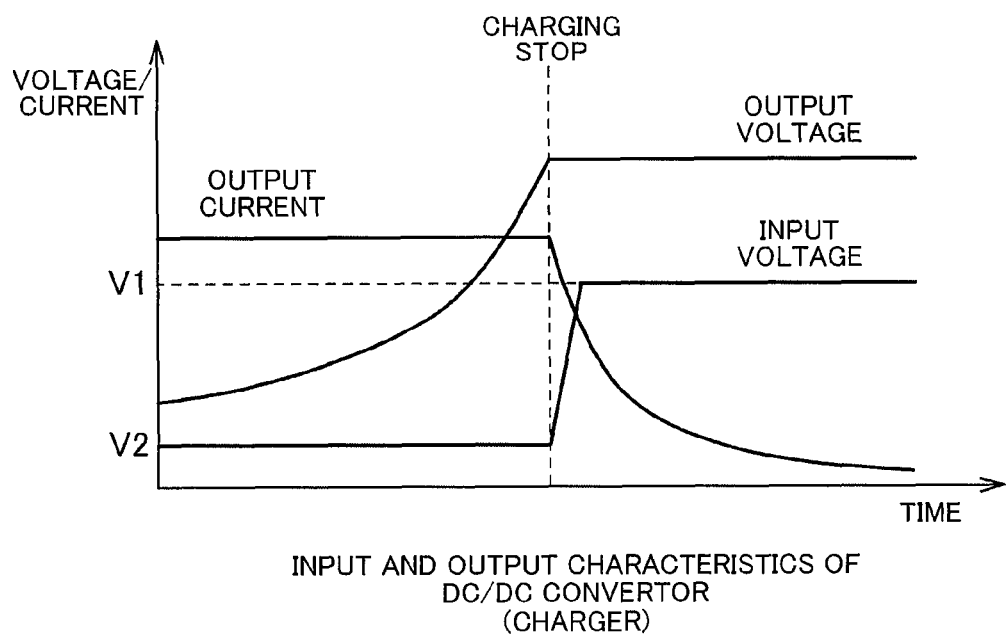
FIG. 5 is a graph showing input and output characteristics of the DC/DC converter shown in FIG. 1.

The control device 124 is constituted of a well-known microcomputer such as a CPU, ROM and RAM. The input and output characteristics of the DC/DC converter 121 arranged to be controlled by this control device 114 are shown in FIG. 5.

When the input voltage (i.e., DC bus voltage $V_{DC}$) measured by the measuring circuit 122 is equal to or less than a lower limit voltage (reference voltage) V2, the control device 124 turns off the switch element, and the voltage conversion by the DC/DC converter 121 is not performed. During the charging, the control device 124 controls the DC/DC converter 121 such that the input voltage corresponds to the lower limit voltage V2.

Once the batteries 3, 4 are charged and output voltages (i.e., battery voltages) are near the fully charged state, the control device 124 controls the DC/DC converter 121 so as to make the output voltage constant. Thus, the charging of the batteries 3, 4 is stopped, so the output current of the DC/DC converter 121 decreases. When the output current of the DC/DC converter 121 decreases, the input voltage increases and becomes the upper limit voltage V1. This upper limit voltage V1 is the same value as the upper limit voltage V1 shown in FIG. 4. Consequently, the input voltage of the DC/DC converter 121 becomes higher than the output voltage of the DC/DC converter 111, thus the output current does not flow from the DC/DC converter 111. That is, the output current from the DC/DC converter 111 stops without notifying from the charger 12 to the control device 114 that it is near a fully charged state.

In this embodiment, as shown in FIG. 4, the lower limit voltage V2 is set in advance to be the output voltage $V_A$ obtained when the output current reaches to the upper limit current I1 as a result of reducing the output voltage of the DC/DC converter 111 and increasing the output current of the DC/DC converter 111, at a rated amount of light A. Thus, the lower limit voltage V2 is set to be equal to or larger than the output voltages $V_B$, $V_C$ obtained when the output current reaches to the upper limit current I1 as a result of reducing the output voltage of the DC/DC converter 111 and increasing the output current of the DC/DC converter 111, at rated amounts of light B, C which are smaller than the rated amount of light A.

Figure 6:
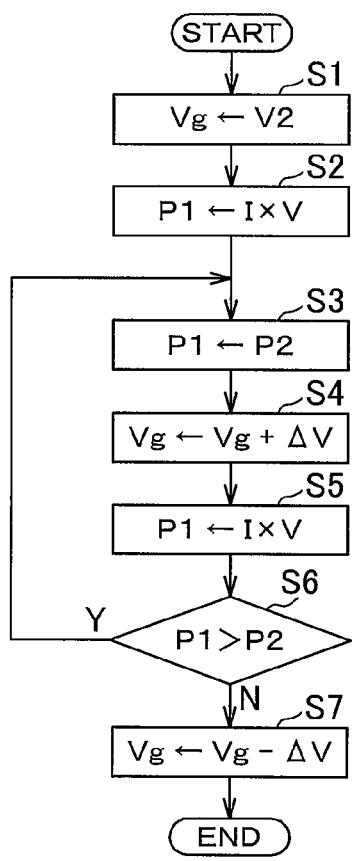
FIG. 6 is a flowchart showing an operation of a control device shown in FIG. 1.

Next, an operation of the power controller 1 configured as described above will be explained with reference to a flowchart shown in FIG. 6. Firstly, when charging, the control device 114 controls such that a target value Vg of the output voltage of the DC/DC converter 111 becomes the lower limit voltage V2 (step S1). Next, the output voltage V and the output current I of the solar panel 2 measured by the measuring circuit 112 are inputted to the control device 114, and the control device 114 calculates present input power P1 by multiplying the inputted output voltage V by the inputted output current I (step S2).

Then, the control device 114 sets the present input power P1 as a last input power P2 (step S3). Next, the control device 114 controls such that the target value Vg of the output voltage of the DC/DC converter 111 increases for ΔV (step S4). The output voltage V and the output current I of the solar panel 2 measured by the measuring circuit 112 are inputted to the control device 114, and the control device 114 calculates a present input power P1 by multiplying the inputted output voltage V by the inputted output current I (step S5). Then, the control device 114 compares the present input power P1 with the last input power P2 (step S6).

If the present input power P1 is larger than the last input power P2 ("Y" in step S6), then the control device 114 returns back to step S3. If the present input power P1 is equal to or less than the last input power P2 ("N" in step S6), then the control device 114 determines that the last input power P2 is maximum power and restores the target value Vg to the last target value Vg (step S7), and ends the process.

According to the above-described embodiment, the plurality of control devices 114 controls each of the plurality of DC/DC converters 111 independently. Each of the plurality of control devices 114 gradually increases or increments the target value Vg of the output voltage of the DC/DC converter 111 from the lower limit voltage V2, calculates the input power (i.e., the output power of the solar panel 2) each time the target value Vg is increased, and searches for the target value Vg of the output power that provides the maximum calculated output power, and maintains that target value Vg. Consequently, the target value is searched from the lower limit voltage V2, thus it will not be equal to or less than the DC bus voltage $V_{DC}$, thereby allowing the output current from each DC/DC converter 111 to flow through the charger 12. Further, since the control device 114 performs the control independently, a control device for grasping the electricity generation amounts of all solar panels 2 is not required, thus the power controller 1 having high power extraction efficiency can be provided at low cost.

According to the above-described embodiment, the lower limit voltage V2 is set to be equal to or larger than the output voltages $V_A$, $V_B$, $V_C$ obtained when the output current reaches to the upper limit current I1 as a result of reducing the output voltage of the DC/DC converter 111 and increasing the output current of the DC/DC converter 111. Consequently, it is possible to control the DC/DC converter 111 not to operate at a constant current I1, that is, it is possible to control the DC/DC converter 111 without current limiting, thereby further improving the power extraction efficiency.

According to the embodiment described above, the output voltage of the DC/DC converter 111 is gradually increased, and the output power of the solar panel 2 at this time is compared with the output power of the solar panel 2 before increasing the output voltage, thereby making the output power of the solar panel 2 to be maximum power. However, the present invention is not limited to this. The control device 114 may include a storage device to which a conversion efficiency of the solar panel 2 is stored in advance, may function as a calculating device and may calculate the maximum power from the conversion efficiency, may gradually increase the output voltage of the DC/DC converter 111, and may compare the output power of the solar panel 2 at that time with the calculated maximum power, thereby making the output power of the solar panel 2 to be maximum power.

Consequently, it is further easier to search the output voltage of the DC/DC converter 111 that generates the maximum power.

The present invention is not limited to the embodiments described above. Various modifications can be made and implemented without departing from the scope of the present invention.

LIST OF REFERENCE SIGNS 1 power controller
2 solar panel (solar cell)
12 charger
111 DC/DC converter (converter)
114 control device (storage device, calculating device)
V2 lower limit voltage (reference voltage)
I1 upper current

What is claimed is:

1. A power controller configured to extract power from a group of solar cells, comprising:
   a plurality of converters provided for each group of solar cells and configured to convert output power of the solar cells;
   a charger including an input to which outputs of the plurality of converters are connected and configured to convert an input voltage with maintaining the input voltage to a reference voltage during charging; and
   a plurality of control devices configured to control each of the plurality of converters independently, wherein
   each of the plurality of control devices is configured to control so as to:
     gradually increase the output voltage of the converter from the reference voltage;
     measure the output power of the solar cell each time the output voltage of the converter is increased; and
     search for the output voltage where the measured output power is maximum and maintain that output voltage, and
   wherein each of the plurality of control devices is configured to control such that the converters operate to provide a constant current when an output current of the converter becomes equal to or larger than an upper limit current, and
   the reference voltage is set to be equal to or larger than the output voltage obtained when the output current has reached to the upper limit current as a result of reducing the output voltage of the converter and increasing the output current of the converter.

2. The power controller as claimed in claim 1, further comprising:
   a storage device configured to store a conversion efficiency of the solar cell; and
   a calculating device configured to calculate a maximum power of the solar cell based on the conversion efficiency, wherein
   the plurality of control devices is configured to control so as to maintain the output voltage of the converter where the measured output power is the maximum power calculated by the calculating device.

* * * * *